United States Patent
Herold et al.

(10) Patent No.: US 11,933,470 B2
(45) Date of Patent: Mar. 19, 2024

(54) PROCESS FOR CONTROLLING A HEADLAMP OF A MOTOR VEHICLE

(71) Applicant: Hella GmbH & Co. KGaA, Lippstadt (DE)

(72) Inventors: Florian Herold, Bielefeld (DE); Christian Hüster, Salzkotten (DE); Boris Kubitza, Möhnesee-Körbecke (DE); Martin Plümpe, Bad Wünnenberg (DE); Udo Venker, Güterlsoh (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 18 days.

(21) Appl. No.: 17/451,545

(22) Filed: Oct. 20, 2021

(65) Prior Publication Data
US 2022/0034471 A1    Feb. 3, 2022

Related U.S. Application Data

(63) Continuation of application No. PCT/EP2020/061118, filed on Apr. 22, 2020.

(30) Foreign Application Priority Data

Apr. 29, 2019    (DE) ............. 10 2019 110 967.1

(51) Int. Cl.
*F21S 41/663*  (2018.01)
*F21S 41/151*  (2018.01)
*F21W 102/14*  (2018.01)

(52) U.S. Cl.
CPC .......... *F21S 41/663* (2018.01); *F21S 41/151* (2018.01); *F21W 2102/14* (2018.01)

(58) Field of Classification Search
CPC ... F21S 41/663; F21S 41/151; F21W 2102/14
(Continued)

(56) References Cited

U.S. PATENT DOCUMENTS

| | | |
|---|---|---|
| 2018/0010755 A1 | 1/2018 | Park et al. |
| 2018/0118095 A1 | 5/2018 | Kunii et al. |

(Continued)

FOREIGN PATENT DOCUMENTS

| | | |
|---|---|---|
| DE | 102004019857 A1 | 12/2004 |
| DE | 102011004569 A1 | 8/2012 |

(Continued)

*Primary Examiner* — Christopher M Raabe
(74) *Attorney, Agent, or Firm* — Husch Blackwell LLP

(57) ABSTRACT

A process is provided for controlling a headlamp of a motor vehicle. The headlamp includes a first light source module and a second light source module. The light source modules each feature several light sources that emit light. The light emitted by the light sources of the light source module represents a first light distribution, and the light emitted by the light sources of the second light source module represents a second light distribution. The first light distribution and the second light distribution partially overlap. The first light distribution and the second light distribution together form an overall light distribution. A subarea of the overall light distribution is formed only by the first light distribution, and the subarea is a vertical edge area of the overall light distribution.

10 Claims, 1 Drawing Sheet

(58) Field of Classification Search
USPC .......................................................... 362/618
See application file for complete search history.

(56) References Cited

U.S. PATENT DOCUMENTS

| | | |
|---|---|---|
| 2018/0334085 A1 | 11/2018 | Ichikawa et al. |
| 2018/0363875 A1 | 12/2018 | Yamamoto |
| 2022/0299183 A1* | 9/2022 | Suwa ..................... F21S 41/24 |

FOREIGN PATENT DOCUMENTS

| | | | |
|---|---|---|---|
| DE | 102015218460 A1 | 3/2016 | |
| DE | 102017129254 A1 | 7/2018 | |
| EP | 2772682 A2 | 9/2014 | |
| JP | 2011065808 A * | 3/2011 | ............ F21S 41/147 |
| KR | 1020160077726 A | 7/2016 | |
| WO | 2014089585 A1 | 6/2014 | |

\* cited by examiner

PROCESS FOR CONTROLLING A HEADLAMP OF A MOTOR VEHICLE

CROSS REFERENCE

This application claims priority to PCT Application No. PCT/EP2020/061118, filed Apr. 22, 2020, which itself claims priority to German Application Serial No. 10 2019 110967.1, filed Apr. 29, 2019, the entirety of both of which are hereby incorporated by reference.

FIELD OF THE INVENTION

The invention relates to a process for controlling a headlamp of a motor vehicle.

BACKGROUND

Processes are known from the current state of technology in which headlamps with two or more light source modules are controlled in such a way that the light emitted from the light source modules overlaps to an overall light distribution.

WO 2014/089585 A1 discloses a process in which a subarea of the overall light distribution is formed by only one of the two light distributions.

BRIEF SUMMARY OF THE INVENTION

In contrast, the task underlying the invention is to create a process in which the risk of double images and blurs in the overall light distribution is reduced. In addition, the task is to create a headlamp and a motor vehicle with such a headlamp.

The headlamp comprises a first light source module and a second light source module. The light source modules each feature several light sources. This can be LEDs, for example. Preferentially, the two light source modules feature the same number of light sources. The light sources emit light. In this context, light is understood to be electromagnetic radiation visible to the human eye. The light emitted by the light sources of the first light source module constitutes a first light distribution. The light emitted by the light sources of the second light source module constitutes a second light distribution. The first and the second light distributions partially overlap each other. Together the first and second light distributions form an overall light distribution. In this context, a subarea of the overall light distribution is formed only by the first light distribution.

The subarea is a vertical edge area of the overall light distribution. Preferentially, this is the entire vertical edge area. Here, the term "vertical" is understood to be in particular a vertical direction when a vertical wall in front of the motor vehicle is illuminated with the headlamp, which wall is aligned parallel to a transverse axis of the motor vehicle. In this context, the transverse axis extends in a horizontal direction vertical to the direction of movement of the motor vehicle when the wheels are not set at any steering angle. This means the vertical edge area can be the upper edge area of the overall light distribution when the wall is illuminated. Preferentially, the entire vertical edge area of the overall light distribution is formed only by the first light distribution.

In particular, the vertical edge area can also be designated as a light-dark cut-off line as this relates to the upper edge area of the overall light distribution. Areas outside the overall light distribution were not illuminated by the headlamp or only by scattered light.

In accordance with one embodiment of the invention, a resolution of the first light distribution can be lower than a resolution of the second light distribution. Within the scope of this description, resolution is understood in particular to be the number of light sources per illuminated area. With the number of light sources on a light source module remaining the same, the resolution is reduced, for example, when a larger area is illuminated with this light source module. Conversely, the resolution increases when a smaller area is illuminated with the light source module.

This applies, in particular, if the area is, for example, a vertical area positioned in front of the motor vehicle.

Illumination of the subarea only with the first light source module is advantageous as the risk of blurs and double images is reduced in this subarea. Double images and blurs can arise, for example, from instances of mechanical imprecision, temperature influences and aging effects, such that the first light distribution and/or the second light distribution deviates from the desired light distribution.

In accordance with one embodiment of the invention a provisional second light distribution can be determined. The second light distribution can then be determined from the provisional second light distribution by the provisional second light distribution being shifted downwards by an offset. This means that the second light distribution can be the provisional second light distribution shifted downwards. In this context, "downwards" is to be understood as the direction when a vertical area in front of the motor vehicle is illuminated by the headlamp, which area is aligned parallel to the transverse axis of the motor vehicle.

Determining the second light distribution from the provisional second light distribution by the shift downwards is advantageous as this ensures that an upper vertical edge area is formed by the first light distribution. Particularly in this edge area, blurs and double images are especially unwanted as legal requirements have to be met. The provisional second light distribution can, for example, be determined as with the current state of technology.

In accordance with one embodiment of the invention, the second light distribution can be determined from the provisional second light distribution only for one of several operating modes of the headlamp. This operating mode can preferentially be the operation of the headlamp in low beam mode. This mode differs, for example, from a high beam mode by a lower light intensity. This is advantageous as the blurs and double images occurring in low beam mode are particularly disruptive.

In accordance with one embodiment of the invention, a first light intensity in accordance with the provisional second light distribution and a second light intensity in accordance with the second light distribution can be determined for each light source of the second light source module. In this respect, the second light intensity is equal to the first light intensity or smaller than the first light intensity. This embodiment is advantageous to minimize changes to the overall light distribution through the determination of the second light distribution from the provisional second light distribution.

In accordance with one embodiment of the invention, when determining the second light distribution, the second light intensity of a first light source can be reduced by an amount if, without such reduction, the second light intensity of the first light source would be larger than the first light intensity of the first light source. If, for example, by shifting the provisional second light distribution downwards by the offset the second light intensity of the first light source is larger than the first light intensity of this first light distribution, the light intensity is reduced by such amount. In particular, the amount can be at least as large as the difference between the first and the second light source. Preferentially, it is exactly the same size as this difference.

If the light intensity of the first light source is reduced by the amount, a light intensity of a second light source of the first light source module can be increased by the same amount. This takes place so that the overall light distribution is not influenced or only to a relatively minor extent.

In accordance with an embodiment of the invention, the first and the second light sources can illuminate the same area. This is especially advantageous to not influence the overall light distribution or only to a relatively minor extent.

In accordance with an embodiment of the invention, the light source modules can be controlled depending on the overall light distribution, an operating mode of the headlamp, a vertical pivoting of the overall light distribution and/or a horizontal pivoting of the overall light distribution. This applies in particular for the calculation of the second light distribution from the provisional second light distribution. The operating mode can be, for example, a high beam mode, a low beam mode or an anti-glare low beam mode. Within the scope of this description, a horizontal pivoting of the overall light distribution is understood, in particular, to be a pivoting due to the wheels of the motor vehicle being set at a steering angle. This can also be designated as dynamic cornering light. Within the scope of this description, a vertical pivoting of the overall light distribution is understood, in particular to be an adjustment of the overall light distribution due to a headlamp leveling arrangement. For example, a smaller offset can be used for the low beam than for the high beam.

In accordance with one embodiment of the invention, it is possible to determine high contrast areas in the overall light distribution and the third light sources illuminating these high contrast areas. An optimization algorithm can then be performed exclusively for controlling the third light sources. The optimization algorithm can, for example, take into consideration the overlapping of the light emitted from different light sources. Performing the optimization algorithm exclusively for the third light sources is advantageous as optimization in the high contrast areas is especially important and reduces the running time of the optimization algorithm. Within the scope of this description, a high contrast area is understood to be, in particular, an area in which a high contrast can be measured on a relatively small area in the overall light distribution.

In accordance with one embodiment of the invention, the high contrast areas can be determined taking into consideration the operating mode of the headlamp, the vertical pivoting of the overall light distribution and/or the horizontal pivoting of the overall light distribution. In low beam mode, for example, the area in the vicinity of the light-dark cut-off line is a high contrast area. The position of the light-dark cut-off line can be determined from the vertical pivoting. In high beam mode, there is a high contrast area in the focal lighting point that can be determined from the vertical and the horizontal pivoting.

In accordance with one embodiment of the invention, the light source modules can be controlled in such a way that any single one of the light source modules projects a symbol. The symbol can, for example, be projected onto the road in front of the motor vehicle. Projecting the symbol with a single light source module is advantageous to reduce the risk of double images and blurs.

In accordance with one embodiment of the invention, the single light source module that projects the symbol can be the second light source module. In this context, it is preferentially the light source module with the higher resolution such that the symbol can be recognized particularly well by a driver of the motor vehicle.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
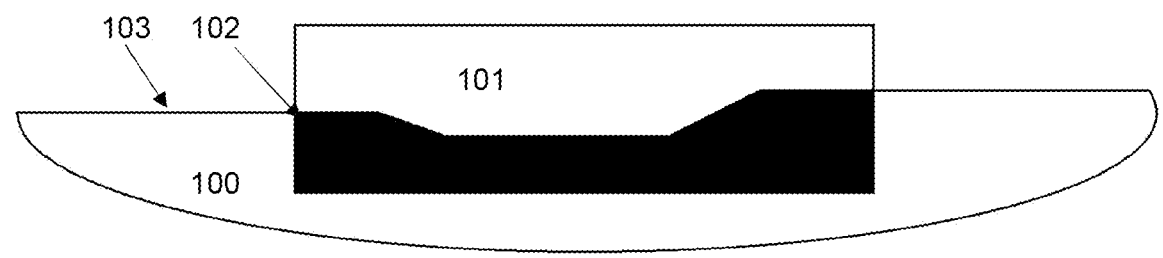
FIG. 1 is a schematic representation of an overall light distribution without a second light distribution shifted by an offset.

FIG. 1 shows a first possible light distribution 100 of a first light source module and a second possible light distribution 101 of a second light source module of a headlamp. It should be noted that it is not absolutely necessary for the entire respective light distribution 100 or 101 to be present when using one of the light source modules. It is possible to use only one part of the corresponding light distribution 100 or 101. The first light distribution 100 features a lower resolution than the second light distribution 101. The two light distributions 100 and 101 overlap in an overlapping area 102.

If the headlamp is operated in low beam mode, the entire first light distribution 100 is used while only the part of the second light distribution 101 within the overlapping area 102 is used. The vertical edge area 103 of the overall light distribution arising from the first light distribution 100 and the part of the second light distribution 101 used is thus formed in one part exclusively from the first light distribution 100 and in a second part from the two light distributions 100 and 101. This is the light-dark cut-off line running several meters in front of the motor vehicle.

Figure 2:
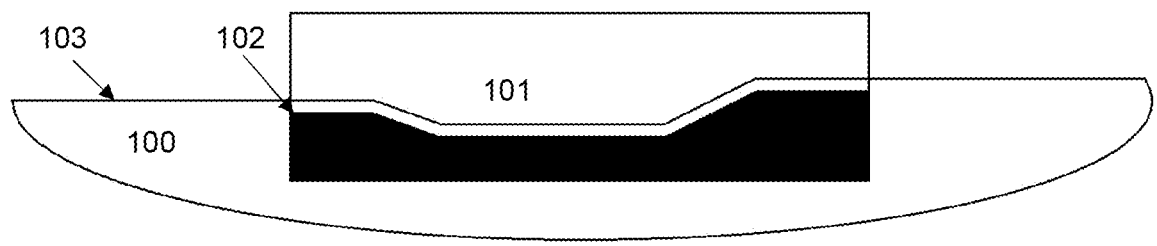
FIG. 2 is a schematic representation of an overall light distribution with a second light distribution shifted by an offset.

To reduce the risk of double images and blurs in particular in the overlapping area 102 from FIG. 1, in the embodiment of the invention in accordance with FIG. 2 the overlapping area 102 is shifted downwards by an offset by the part of the first light distribution 101 used being shifted downwards by the offset.

If the two light distributions 100 and 101 now no longer correspond in practice to the data stored in the control system due to instances of mechanical imprecision, temperature fluctuations and/or aging effects, the risk of double images and blurs is reduced in the overall light distribution from FIG. 2 as the entire vertical edge area 103 is formed exclusively by the first light distribution 100. This means that if, for example, the second light distribution 101 is shifted slightly upwards in an undesired manner, this will be hardly perceptible to the driver of the motor vehicle as the light-dark cut-off line is still formed by the first light distribution 100 alone.

LIST OF REFERENCE NUMBERS

100 First light distribution
101 Possible second light distribution
102 Overlapping area
103 Vertical edge area

What is claimed is:

1. A light distribution arrangement for a headlamp of a motor vehicle, the light distribution arrangement comprising:
a first light distribution;
a second light distribution including a used part and an unused part, wherein light is emitted in the used part, and wherein light is not emitted in the unused part;
an overlapping area where the first light distribution overlaps the used part of the second light distribution;
a vertical edge area defined by an upper edge of the first light distribution;
wherein in a first configuration, the used part of the second light distribution abuts the vertical edge area; and
wherein in a second configuration, the used part of the second light distribution is shifted away from the vertical edge area such that the used part of the second light distribution does not abut the vertical edge area.

2. The light distribution arrangement in accordance with claim 1, wherein a resolution of the first light distribution is lower than a resolution of the second light distribution.

3. The light distribution arrangement in accordance with claim 1, wherein in the second configuration, the used part of the second light distribution is shifted downward.

4. The light distribution arrangement in accordance with claim 3, further comprising:
a plurality of light sources, each light source corresponding to one of the first light distribution and the second light distribution;
wherein each light source of the second light distribution includes a first light intensity and a second light intensity, wherein the first light intensity is generated in the first configuration, and wherein the second light intensity is generated in the second configuration; and
wherein the second light intensity of each light source of the second light distribution is smaller than or the equal to the first light intensity of the light source.

5. The light distribution arrangement process in accordance with claim 4, wherein the second light intensity of each light source of the second light distribution is reduced by a threshold amount if, without such reduction, the second light intensity of the light source would be larger than the first light intensity of the first light source; and
wherein if the second light intensity of a light source of the second light distribution is reduced by the threshold amount, then in the second configuration, a light intensity of at least one light source of the first light distribution is increased by the threshold amount compared to the light intensity of the light source in the first configuration.

6. The light distribution arrangement of claim 5, wherein in the second configuration, a light intensity of a light source of the first light distribution is increased by the threshold amount if the light source of the first light distribution illuminates the same area as a light source of the second light distribution with the second light intensity reduced by the threshold amount.

7. The light distribution arrangement in accordance with claim 1, wherein the first light distribution and the second light distribution are controlled depending on at least one of: an overall light distribution, an operating mode of the headlamp, a vertical pivoting of the overall light distribution, and a horizontal pivoting of the overall light distribution.

8. The light distribution arrangement in accordance with claim 1, wherein high contrast areas in the light distribution arrangement are illuminated by third light sources, and wherein an optimization algorithm is performed exclusively to control the third light sources.

9. The light distribution arrangement in accordance with claim 1, wherein:
the first light distribution and the second light distribution are controlled depending on an overall light distribution, an operating mode of the headlamp, a vertical pivoting of the overall light distribution and/or a horizontal pivoting of the overall light distribution;
high contrast areas in the light distribution arrangement are illuminated by third light sources;
an optimization algorithm is performed exclusively to control the third light sources; and
high contrast areas are determined taking account at least one of: the operating mode of the headlamp, the vertical tilting of the overall light distribution, and the horizontal tilting of the overall light distribution.

10. The light distribution arrangement in accordance with claim 1, wherein the first light distribution and the second light distribution are controlled in such a way that at least one of the first light distribution and the second light distribution projects a symbol.

* * * * *